United States Patent
Bortnik et al.

(10) Patent No.: US 12,208,349 B2
(45) Date of Patent: Jan. 28, 2025

(54) RETURN LINE IN-TANK FILTER ASSEMBLY WITH DISPOSABLE FILTER ELEMENT

(71) Applicant: Schroeder Industries, LLC, Leetsdale, PA (US)

(72) Inventors: Christopher B. Bortnik, Warrendale, PA (US); Matt Adams, Pittsburgh, PA (US); Scott F. Surdick, Pittsburgh, PA (US); Michael J. Schmitt, Pittsburgh, PA (US); Augustus O. Schroeder, Pittsburgh, PA (US)

(73) Assignee: SCHROEDER INDUSTRIES, LLC, Leetsdale, PA (US)

( * ) Notice: Subject to any disclaimer, the term of this patent is extended or adjusted under 35 U.S.C. 154(b) by 0 days.

(21) Appl. No.: 18/378,132

(22) Filed: Oct. 9, 2023

(65) Prior Publication Data
US 2024/0123378 A1  Apr. 18, 2024

Related U.S. Application Data

(63) Continuation of application No. PCT/US2022/024124, filed on Apr. 8, 2022.

(60) Provisional application No. 63/172,503, filed on Apr. 8, 2021.

(51) Int. Cl.
*B01D 35/027*   (2006.01)
*B01D 29/23*    (2006.01)
*B01D 35/147*   (2006.01)

(52) U.S. Cl.
CPC ......... *B01D 35/0276* (2013.01); *B01D 29/23* (2013.01); *B01D 35/147* (2013.01); *B01D 2201/4053* (2013.01)

(58) Field of Classification Search
CPC .. B01D 35/0276; B01D 29/23; B01D 35/147; B01D 2201/4053; B01D 2201/4061; B01D 35/306; B01D 2201/24
See application file for complete search history.

(56) References Cited

U.S. PATENT DOCUMENTS

| 6,475,380 | B1 | 11/2002 | Fangmann et al. |
| 6,508,271 | B2 | 1/2003 | Evanovich et al. |
| 7,252,759 | B2 | 8/2007 | Evanovich et al. |
| 10,525,385 | B2 | 1/2020 | Bortnik et al. |
| 11,358,080 | B2 | 6/2022 | Bortnik et al. |

(Continued)

FOREIGN PATENT DOCUMENTS

| JP | 2000246026 | 9/2000 |
| JP | 2004205045 | 7/2004 |
| WO | 2022217127 | 10/2022 |

*Primary Examiner* — Terry K Cecil
(74) *Attorney, Agent, or Firm* — Blynn L. Shideler; Krisanne Shideler; BLK Law Group

(57) ABSTRACT

An in-tank filter assembly for an industrial fluid reservoir tank includes a two piece filter assembly mount comprising an upper filter mount and a lower tank extension member; an element and bypass plate; a bypass structure within the element and bypass plate; a filter element mount coupled to the element and bypass plate; the disposable filter element removably coupled to the filter element mount, wherein the filter assembly forms a bowl-less in tank return line filter having inside-out flow; and an inlet closing valve configured to selectively close off the inlet and biased toward a closed position, wherein the inlet closing valve is configured to automatically close off the inlet when the disposable filter element is removed from the filter element mount.

19 Claims, 10 Drawing Sheets

(56) References Cited

U.S. PATENT DOCUMENTS

2020/0030724 A1 1/2020 Bautz et al.
2020/0261833 A1 8/2020 Bortnik et al.

RETURN LINE IN-TANK FILTER ASSEMBLY WITH DISPOSABLE FILTER ELEMENT

This application is a continuation of International Patent Application Serial Number PCT/US2022/024124 filed Apr. 8, 2022 titled "Return Line In-Tank Filter Assembly with Disposable Filter Element" which published Oct. 13, 2022 as publication number WO 2022/217127, which application and publication are incorporated herein by reference.

International Patent Application Serial Number PCT/US2022/024124 claims the benefit of Provisional Application Ser. No. 63/172,503 filed Apr. 8, 2021, titled "Return Line In-Tank Filter Assembly with Disposable Filter Element", which application is incorporated herein by reference.

BACKGROUND OF THE INVENTION

Field of the Invention

The present invention pertains to in-tank filter assemblies.

Background Information

Industrial fluid systems, such as hydraulic fluid systems, typically include a fluid reservoir in which returning fluid is filtered before entering the reservoir tank. The replaceable filter element in some tanks is set into a molded filter bowl receiving the replaceable filter element, while other deigns utilize a complete filter housing assembly.

As further background U.S. Pat. Nos. 6,116,454; 6,475,380, 6,508,271 and 7,252,759 disclose hydraulic reservoir designs that incorporate specific in-tank filter assemblies therein, and these patents are incorporated herein by reference. The filter assemblies can be on the outlet lines, as shown in the '454 patent or in the inlet lines as shown in the '380 and '271 patents. A filter assembly on the outlet or suction side of a hydraulic reservoir is generally a filter element formed by a simple strainer. Placing the filter assembly in the inlet or return lines that extends to the reservoir, as shown in the '271, '380 and '759 patents provides certain advantages relating to the energy required by filtration and returning of the fluid to the reservoir.

The large majority of in-tank filter elements for hydraulic reservoirs utilize a return line filter element of some kind. One known or common example is a forming a partition or separate bowl structure within the hydraulic reservoir and incorporating a top mounted, or drop-in, filter element therein. A similar known configuration is to have the filter element as part of a larger filter assembly with integrated bowl which is "dropped" into the top of the container with the return lines connected directly to the head of the filter assembly. This filter element is also a top mounted structure. The term "top mounted" refers to access or mounting direction in that the filter element is accessed and replaced through the top of the reservoir, such as in the '271 and '759 patents. See also U.S. Pat. No. 10,525,385 which is incorporated herein by reference.

There remains a need in the art for a reducing the cost space and weight of in-tank filter assemblies.

SUMMARY OF THE INVENTION

The objects of the present invention is achieved according to one embodiment of the present invention by providing an in-tank filter assembly for an industrial fluid reservoir tank including a two piece filter assembly mount comprising an upper filter mount and a lower tank extension member, wherein the lower tank extension member includes tank coupling elements to secure the filter assembly mount to a tank, and wherein the upper filter mount includes an inlet connection configured to be coupled to an inlet line of the tank; an element and bypass plate; a bypass structure within the element and bypass plate configured to selectively open allowing flow to flow around a disposable filter element of the in-tank filter assembly into the tank in bypass operation; a filter element mount coupled to the element and bypass plate; the disposable filter element removably coupled to the filter element mount through a filter element coupling and including at least a top end cap and a bottom end cap with filter media extending between the top end cap and the bottom end cap, wherein the filter assembly forms a bowl-less in tank return line filter having inside-out flow; and an inlet closing valve configured to selectively close off the inlet and biased toward a closed position, wherein the inlet closing valve is configured to automatically close off the inlet when the disposable filter element is removed from the filter element mount.

The features that characterize the present invention are pointed out with particularity in the claims which are part of this disclosure. These and other features of the invention, its operating advantages and the specific objects obtained by its use will be more fully understood from the following detailed description taken together with the figures.

DESCRIPTION OF THE PREFERRED EMBODIMENT

Figure 1A:
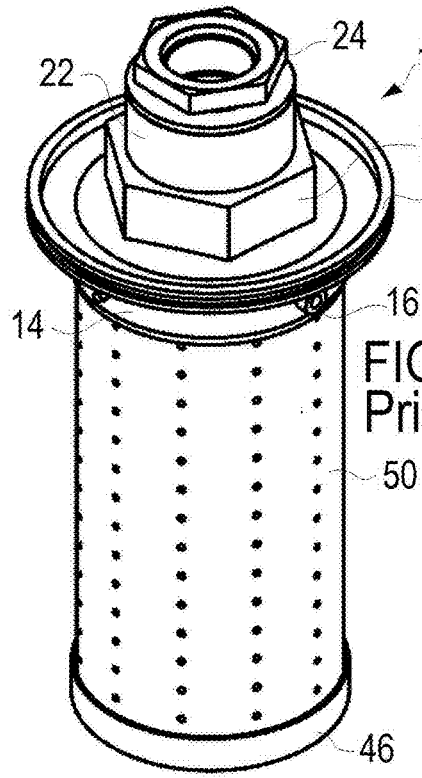
FIG. 1A is a perspective view of a return line in-tank filter assembly with disposable filter element according to a first embodiment of the invention of U.S. Patent Application publication 2020-0261833 upon which the present invention builds.
Figure 1B:
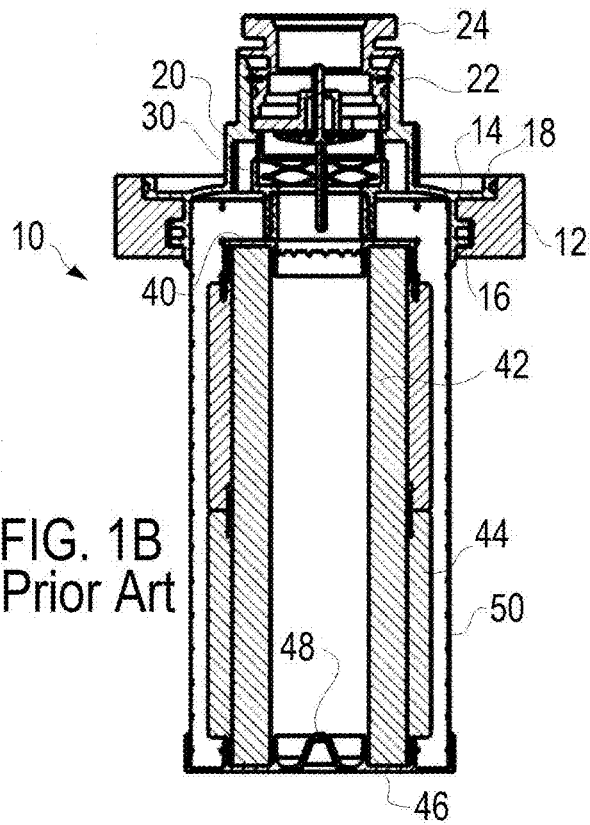
FIG. 1B is a side elevation section view of the return line in-tank filter assembly with disposable filter element according to FIG. 1A.
Figure 1C:
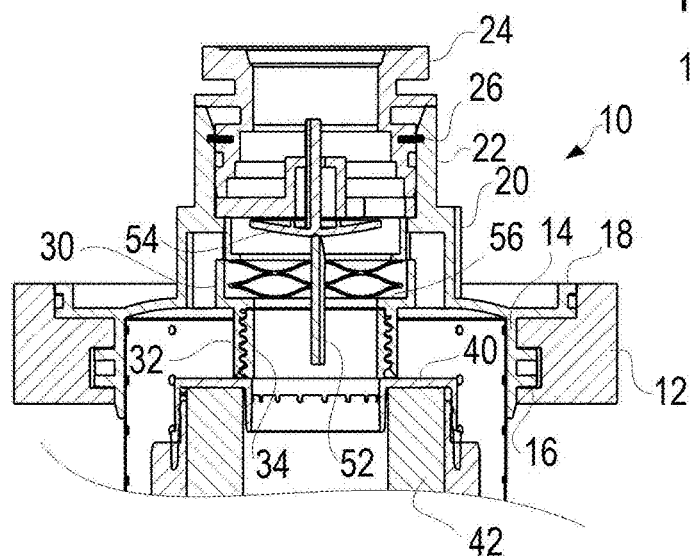
FIG. 1C is an enlarged side elevation section view of the tank coupling end of the return line in-tank filter assembly with disposable filter element according to FIG. 1A.
Figure 1D:
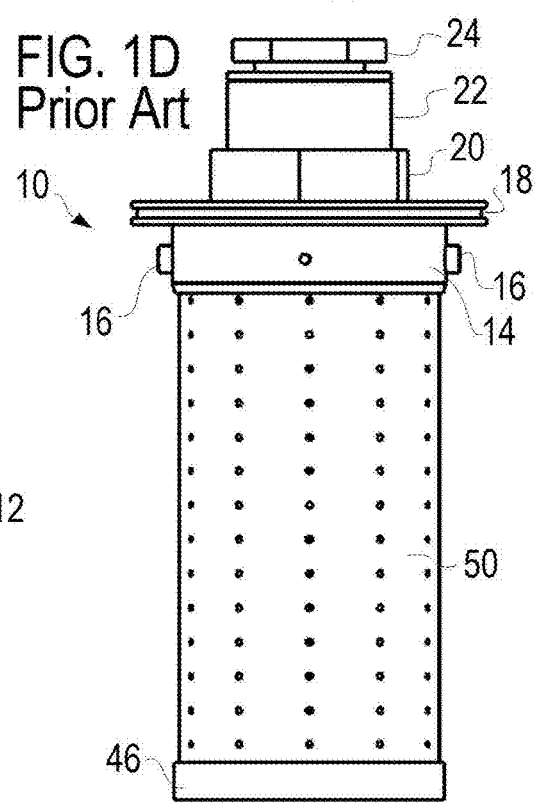
FIG. 1D is a side elevation view of the return line in-tank filter assembly with disposable filter element according to FIG. 1A.

The present invention is a return line filter for an industrial fluid reservoir, most commonly a hydraulic fluid reservoir or tank, and provides an in-tank filter assembly 410 with disposable filter element.

This application builds upon the work set forth in U.S. Patent Application publication 2020-0261833, now U.S. Pat. No. 11,358,080, titled "Return Line In-Tank Filter Assembly with Disposable Filter Element." The discussion of the in-tank filter assemblies 10, 110, 210, and 310 described in U.S. Patent Application publication 2020-0261833, now U.S. Pat. No. 11,358,080, will help describe the operation and function of the in-tank filter assembly 410 with disposable filter element of the present claimed invention A first embodiment of the in-tank filter assembly 10 with disposable filter element set forth in U.S. Patent Application publication 2020-0261833 is shown in FIGS. 1A-D. The in-tank filter assembly 10 includes a filter assembly mount 14 with tank coupling elements 16 to secure the assembly mount 14 to the tank 12.

The tank 12 is actually shown as an insert, or weld ring, that itself is coupled to the tank or reservoir proper. This separate construction of the insert for the tank allows the insert to be formed with elements cooperating with the tank coupling elements 16. However, for this application the terms "tank" or "reservoir" or "insert" can be used interchangeably. The tank coupling elements 16 may be any conventional securing elements, such as locking lugs shown or threads or the like. The lugs of elements 16 are received in grooves in the insert or tank 12 and twisted to lock the mount 14 in position.

The mount 14 further includes a sealing flange 18 configured to allow for sealing against cooperating surfaces of the tank 12 (or insert). As shown the flange 18 can receive a sealing O-ring or seal that radially seals against the tank. The receipt of the mount 14 including the tank coupling elements 16 and the surface cooperating with flange 18 are essentially the only tank features needed on the tank 12 to accommodate the filter assembly 10 of the present invention and this greatly simplifies the tank design and construction. The use of an insert, or weld ring, on the tank further simplifies the application of the present invention to a wide variety of tanks.

The mount 14 includes a hex shaped portion 20 to facilitate the coupling and uncoupling of the filter assembly 10 with the tank 12. The mount 14 includes an inlet tube 20 extending above the hex shaped portion. An inlet connection 24 is coupled to the inlet tube 20 through spiral spring connectors 26 that are received in a groove. The inlet connection 24 is coupled to an inlet line of the reservoir in a conventional fashion. Forming the inlet connection as separate from the remaining portions of the mount 14 allows the filter assembly to accommodate different sized inlet hoses/lines. In other words the same filter assembly 10 can be used with different sized inlet hoses by merely replacing the inlet connection 24 with the appropriate sized inlet. Further the inlet connection can be replaced with distinct hose couplings, like barb connections, if desired.

The filter assembly 10 includes a bypass structure 30 in the mount 14 which positioning yields an elevated flow path that avoids having contaminants within the interior space of the filter element from flowing into the interior of the tank during bypass operation.

The filter assembly 10 includes a filter element mount 32 extending from the bypass structure 30 for coupling a disposable filter element to the filter assembly. The filter element mount 32 is threaded and cooperates with threads on a disposable filter element coupling 34 to remove-ably secure the filter element to the filter assembly 10.

The filter coupling 34 is attached to the top end cap 40 of the disposable filter element, with filter media 42 and external support wrap 44 extending between the top or upper end cap 40 and a lower or bottom end cap 46. The terms top and upper are used interchangeably in this application as are the terms bottom and lower. The construction of the filter media 42 and the support wrap 44 is generally known in the art. For example the media 42 can be formed of a number of desired filter media and generally is a multi-layer structure.

The lower end cap 46 supports an inner fluid diverter 48 to modulate flow within the element, and a perforated outlet wrap 50 spaced from the outer support wrap 44 and media 42 also extending between the top end cap 40 and a lower end cap 46.

The filter assembly 10 includes an inlet closing valve 54 that can seat against a sealing surface 56 to close off the inlet. The disposable filter element includes a valve opening stem 52 attached to the coupling 34 and engaging with the valve 54 when the filter element is coupled to the filter assembly. The inlet closing valve is helpful to prevent fluid spillage from residual fluid in the inlet line during disposable filter element change-out or replacement. Namely, the valve 54 will seal against surface 56 closing off the inlet when the filter element is removed, via operational or spring pressure (not shown).

The valve 54 has a built in failure mode that it breaks off at a reasonable operational pressure to prevent the system from causing other upstream problems should the filter element not be replaced and the mount returned into engagement without a filter element (and thus without opening the valve 54). In the failure mode the valve 54 will have a component break and fold down to open the fluid pathway while still maintaining the valve components with the mount 14 so that pieces of the broken valve do not flow into the tank and downstream.

The inlet closing valve 54 could also be formed to be spring biased into the closed position with operational pressure in the inlet (higher than head pressure of residual fluid) sufficient to open the valve. This alternative allows the stem to be optional. The present design is somewhat easier to configure.

The filter element is an inside-out flow design in operation as shown. In operation the filter assembly 10 acts as a bowl-less or housing less in tank return line filter. The filter element is disposable, with the filter element comprising the combination of filter coupling 34, top end cap 40, filter media 42, external support wrap 44, lower end cap 46, inner fluid diverter 48, perforated outlet wrap 50 and valve opening stem 52.

During replacement the filter element mount 14 is removed from the tank 12. The filter element is unthreaded from the mount 14. With the removal of the old filter element the inlet closing valve 54 closes preventing dripping of fluid from the inlet line during the change out. A new disposable filter element (also formed by filter coupling 34, top end cap 40, filter media 42, external support wrap 44, lower end cap 46, inner fluid diverter 48, perforated outlet wrap 50 and valve opening stem 52) is threaded onto the mount 14 and the mount 14 is reattached to the tank 12. The mount 14 and associated structure is maintained and no inlet reattachment is required with the filter assembly 10. The mount 14 may be formed of metal or other sufficient material and the cost of forming this is less critical because it is not being replaced.

Figure 2A:
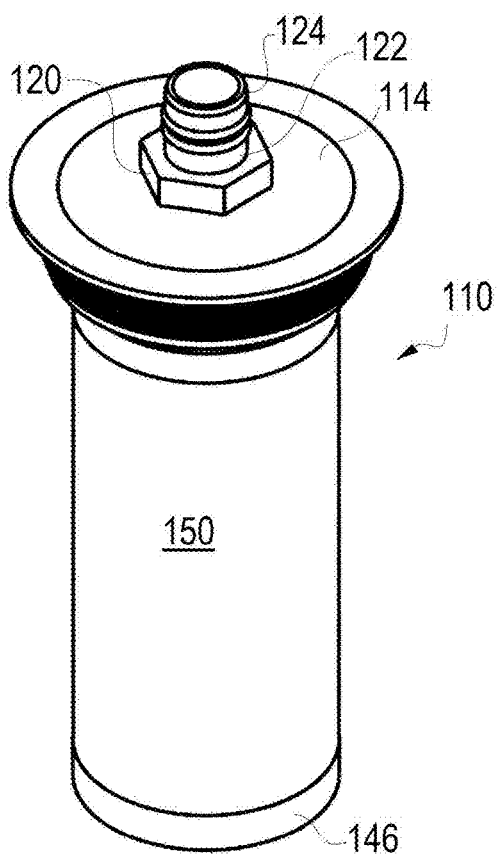
FIG. 2A is a perspective view of a return line in-tank filter assembly with disposable filter element according to a second embodiment of the invention of U.S. Patent Application publication 2020-0261833 upon which the present invention builds.
Figure 2B:
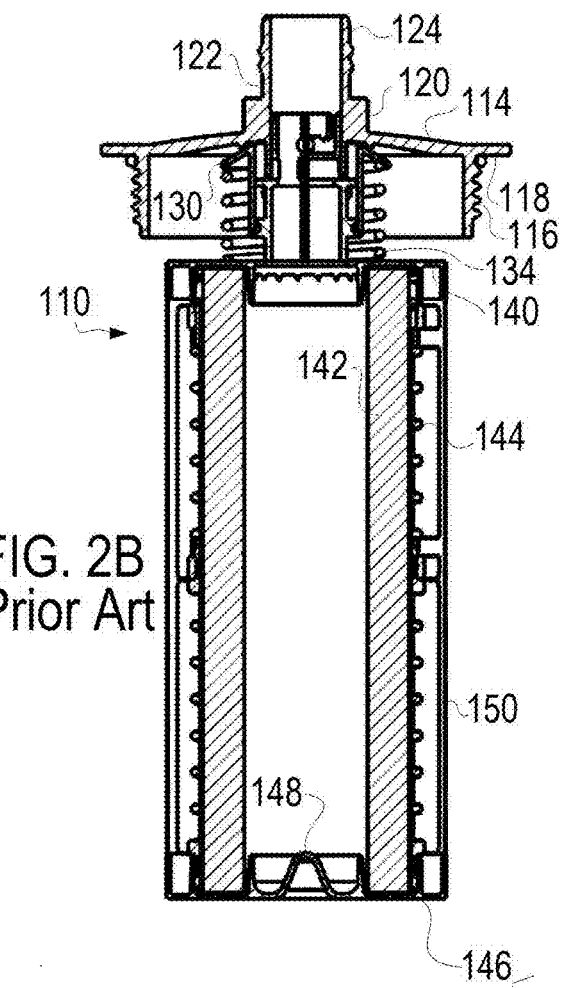
FIG. 2B is a side elevation section view of the return line in-tank filter assembly with disposable filter element according to FIG. 2A.
Figure 2C:
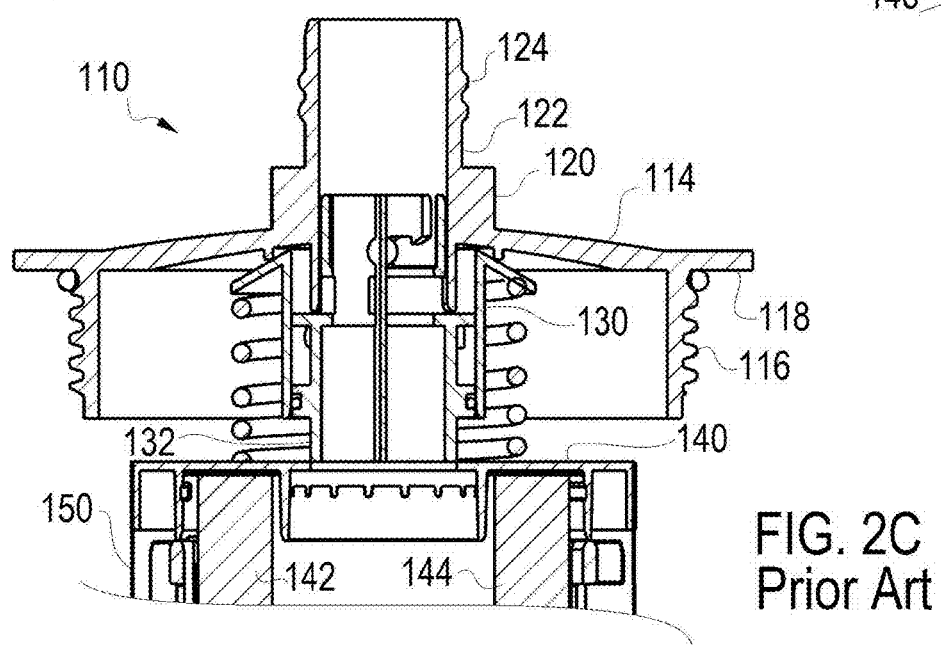
FIG. 2C is an enlarged side elevation section view of the tank coupling end of the return line in-tank filter assembly with disposable filter element according to FIG. 2A.

A second embodiment set forth in U.S. Patent Application publication 2020-0261833 is the in-tank filter assembly 110 with disposable filter element shown in FIGS. 2A-C. The in-tank filter assembly 110 includes a filter assembly mount 114 with tank coupling elements 116 to secure the assembly mount 114 to the tank 12. The mount 114 as shown provides for a threaded connection with elements 116 to the reservoir or tank 12 and includes a sealing flange 118 configured to allow for sealing against cooperating surfaces of the tank 12 (or insert). As shown, the flange 118 can receive a sealing O-ring or seal that seals against the tank. The receipt of the mount 114 including the tank coupling elements cooperating with elements 116 and the surface cooperating with flange 118 are essentially the only tank features needed on the tank 12 to accommodate the filter assembly 110 of the present invention and this greatly simplifies the tank design and construction.

The mount 114 includes a hex shaped portion 120 to facilitate the coupling and uncoupling of the filter assembly 110 with the tank. The mount 114 includes an inlet tube 120 extending above the hex shaped portion 120. An inlet connection 124 extends from the inlet tube 122 and in this embodiment is integrally formed therewith. The inlet connection 124 is coupled to an inlet line in a conventional fashion. The inlet connection 124 uses a quick hose connection such as a hose barb, or alternatively a quick disconnect plug, to allow for easy connection and disconnection with the return line. The filter assembly 110 forms the inlet connection for the reservoir.

The filter assembly 110 includes a bypass structure 130 in the mount 114. As with assembly 10, the positioning of bypass structure 130 yields an elevated flow path that avoids having contaminants within the interior space of the filter element from flowing into the interior of the tank during bypass operation. The filter assembly 110 includes a filter element mount 132 extending from the bypass structure 130 for coupling the filter element to the disposable filter assembly 110. The filter element mount 132 is attached to the top end cap 140, with filter media 142 and external support wrap 144 extending between the top end cap 140 and a lower end cap 146. The lower end cap 46 supports an inner fluid diverter 148 to modulate flow within the element, and a perforated outlet wrap 150 spaced from the outer support wrap 144 also extending between the top end cap 140 and a lower end cap 146. The construction of the filter media 142, the outer support wrap 144 and perforated outer wrap 150 is generally known in the art.

The filter element of assembly 110 is an inside out flow design in operation as shown. In operation the filter assembly 110 acts as a bowl-less or housing less in tank return line filter. The filter assembly 110, including the integral filter element, is disposable. For replacement, the filter mount 114 is removed from the tank 12 and the inlet hose removed from the inlet connection 124. The inlet hose is coupled to the inlet connection 124 of the replacement assembly 110 and the mount 114 thereof attached to the tank 12. The entire assembly 110, including the mount 114, is disposable and thus molding the mount 114 may be desirable for cost considerations.

Figure 3A:
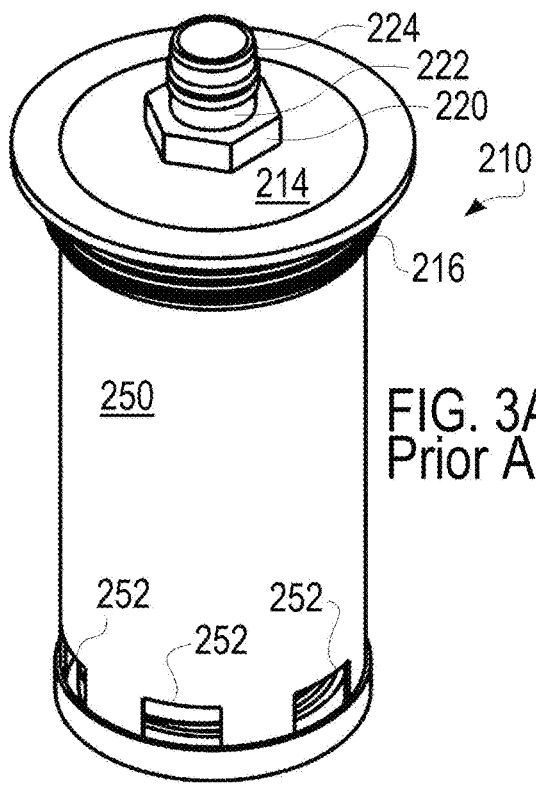
FIG. 3A is a perspective view of a return line in-tank filter assembly with disposable filter element according to a third embodiment of the invention of U.S. Patent Application publication 2020-0261833 upon which the present invention builds.
Figure 3B:
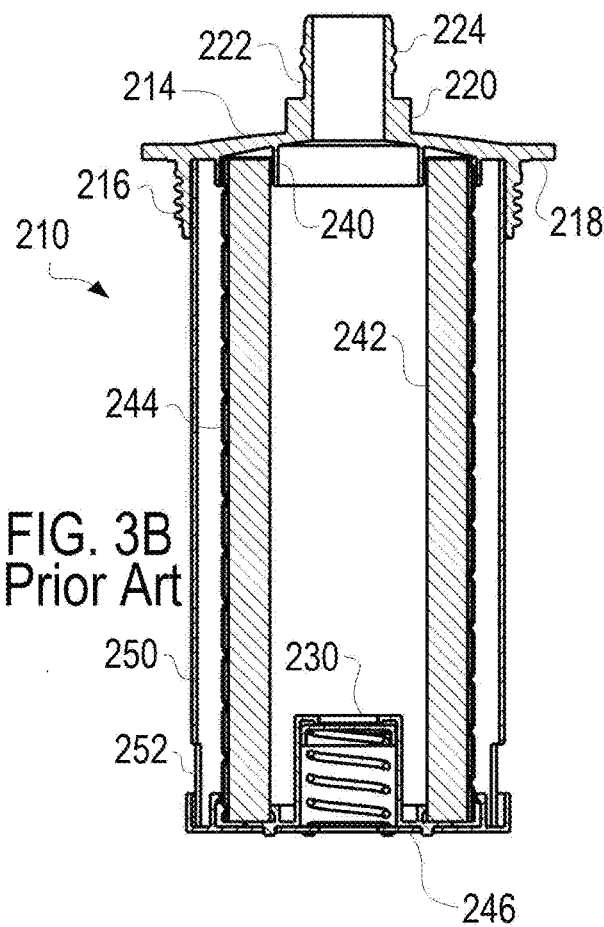
FIG. 3B is a side elevation section view of the return line in-tank filter assembly with disposable filter element according to FIG. 3A.
Figure 3C:
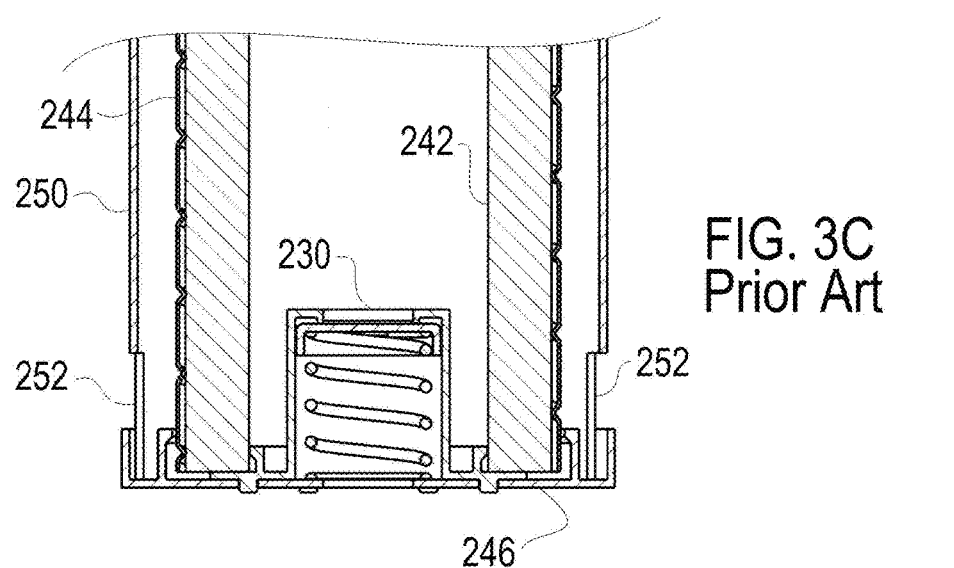
FIG. 3C is an enlarged side elevation section view of the in-tank end of the return line in-tank filter assembly with disposable filter element according to FIG. 2A.

A third embodiment of the in-tank filter assembly 210 with disposable filter element as set forth in U.S. Patent Application publication 2020-0261833 is shown in FIGS. 3A-C. The in-tank filter assembly 210 includes a filter assembly mount 214 (which may be molded) with tank coupling elements 216 to secure the assembly mount 214 to the tank 12. The mount 214 as shown provides for a threaded connection with elements 216 to the reservoir or tank 12 as discussed above. The mount 214 further includes a sealing flange 218 configured to allow for sealing against cooperating surfaces of the tank 12 (or insert). The mount 214 includes a hex shaped portion 220 to facilitate the coupling and uncoupling of the filter assembly 210 with the tank 12. The mount 214 includes an inlet tube 220 extending above the hex shaped portion 220. An inlet connection 224 extends from the inlet tube 222 and in this embodiment, like the second embodiment, is integrally formed therewith. The inlet connection 224 uses a quick hose connection such as a hose barb, or alternatively a quick disconnect plug, to allow for easy connection and disconnection with the return line. The filter assembly 210 includes a bypass structure 230 in a bottom end cap 246, which is a different position than the bypass 30 and 130 of assemblies 10 and 110 above.

With the lower bypass 230 location, the filter assembly 210 includes the top end cap 240 as integral with the mount 214. The top end cap 240 may effectively be considered the lower surface of the mount 214. Filter media 242 and external support wrap 244 extend between the top end cap 240 and a lower end cap 246. The lower end cap 246 supports the bypass 230 as discussed above, and an outer shroud 250 spaced from the outer support wrap 244 and the media 242 and is also extending between the top end cap 240 and a lower end cap 246. The construction of the filter media 242 and the outer support wrap 244 is known in the art.

The outer shroud 250 includes lower outlets 252 and differs from the perforated outer wraps 150 or 50 above. The outer shroud 250 extends from the endcap 240 and directs returning fluid that flows through the filter element to a position typically below fluid tank level in the tank before the fluid leaves the shroud 250 via outlets 252. The filter element of assembly 210, like assembly 110 and 10, is an inside out flow design in operation as shown. In operation the filter assembly 210 acts as a bowl-less or housing less in tank return line filter. The filter assembly 210, including the integral filter element, is disposable, like assembly 110. For replacement, the filter mount 214 is removed from the tank 12 and the inlet hose removed from the inlet connection 224. The inlet hose is coupled to the inlet connection 224 of the replacement assembly 210 and the mount 214 thereof attached to the tank 12. The entire assembly 210, including the mount 214, is disposable and thus molding the mount 214 may be desirable for cost considerations.

Figure 4A:
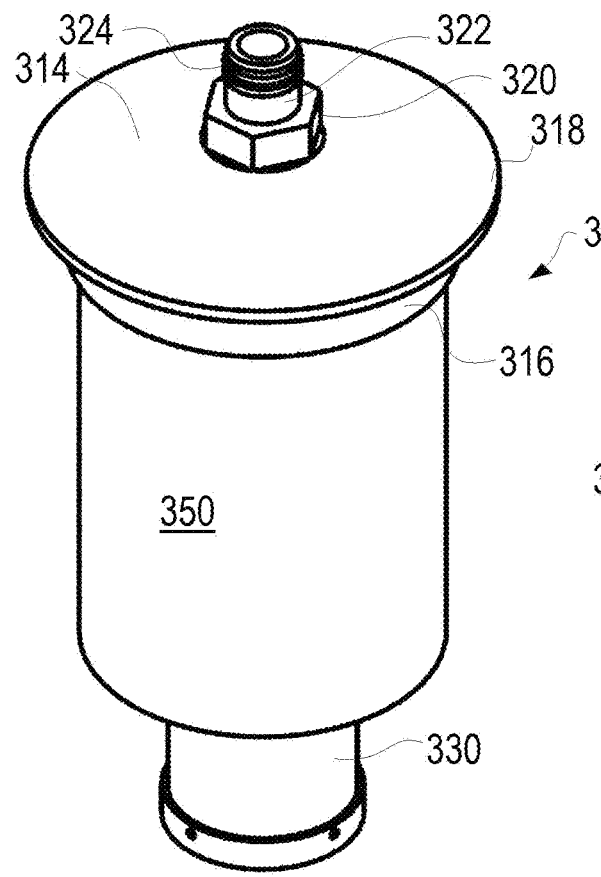
FIG. 4A is a perspective view of a return line in-tank filter assembly with disposable filter element according to a fourth embodiment of the invention of U.S. Patent Application publication 2020-0261833 upon which the present invention builds.
Figure 4B:
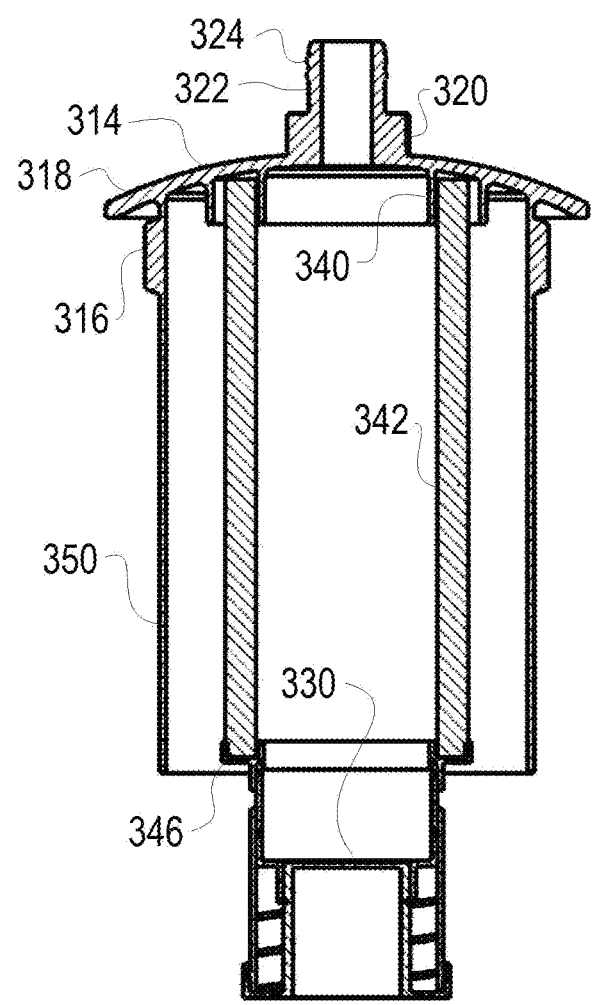
FIG. 4B is a side elevation section view of the return line in-tank filter assembly with disposable filter element according to FIG. 4A.
Figure 5A:
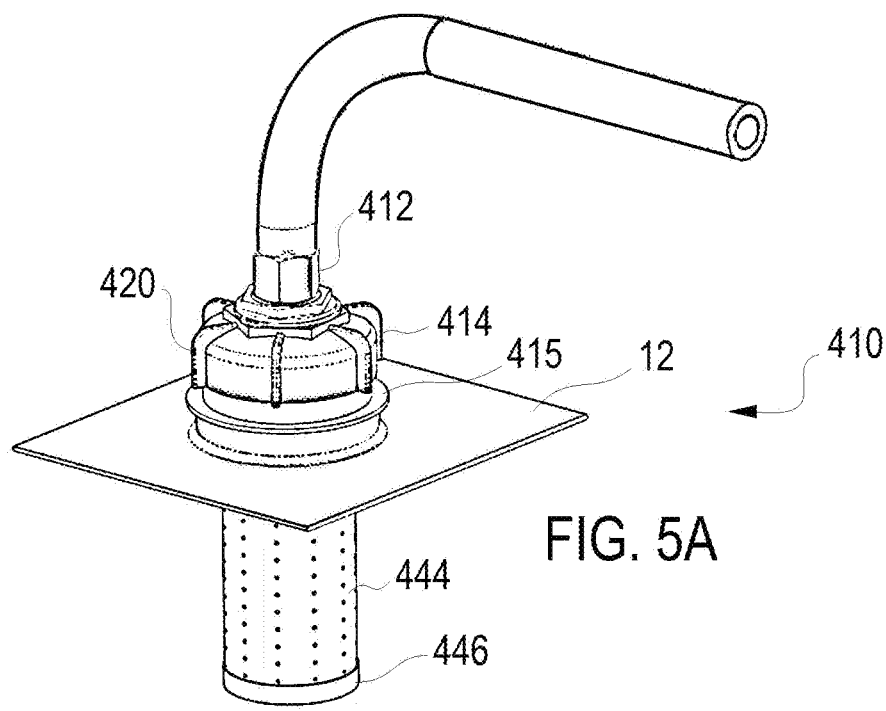
FIG. 5A is a perspective view of a return line in-tank filter assembly with disposable filter element according to an embodiment of the present invention.
Figure 5B:
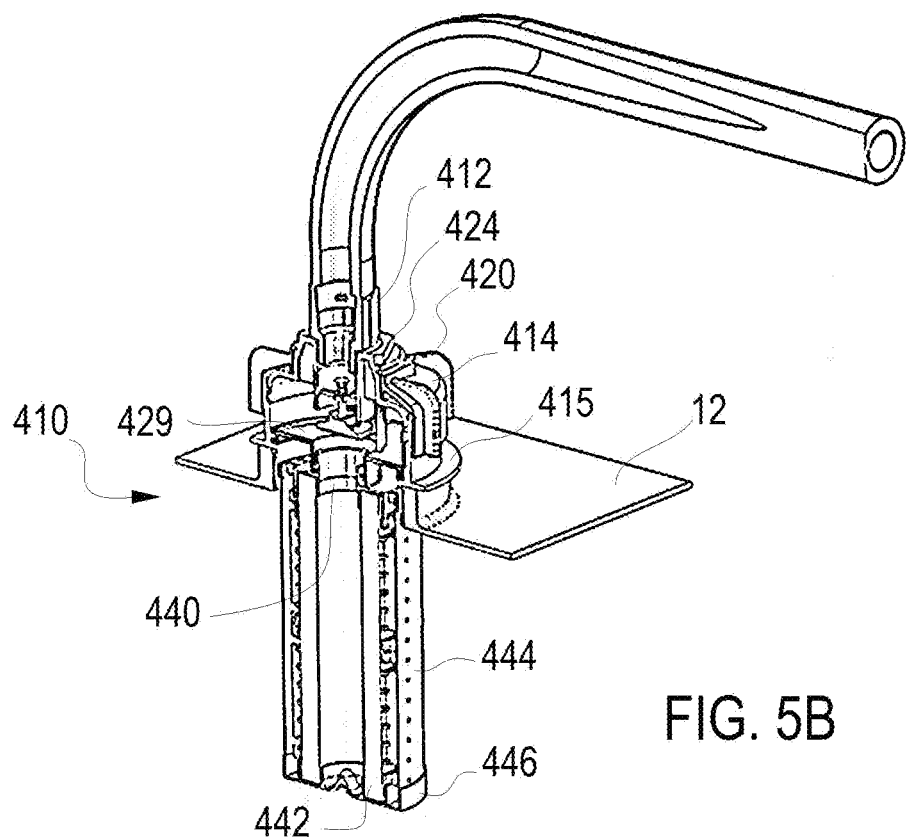
FIG. 5B is a perspective section view of the return line in-tank filter assembly with disposable filter element according to FIG. 5A.
Figure 5C:
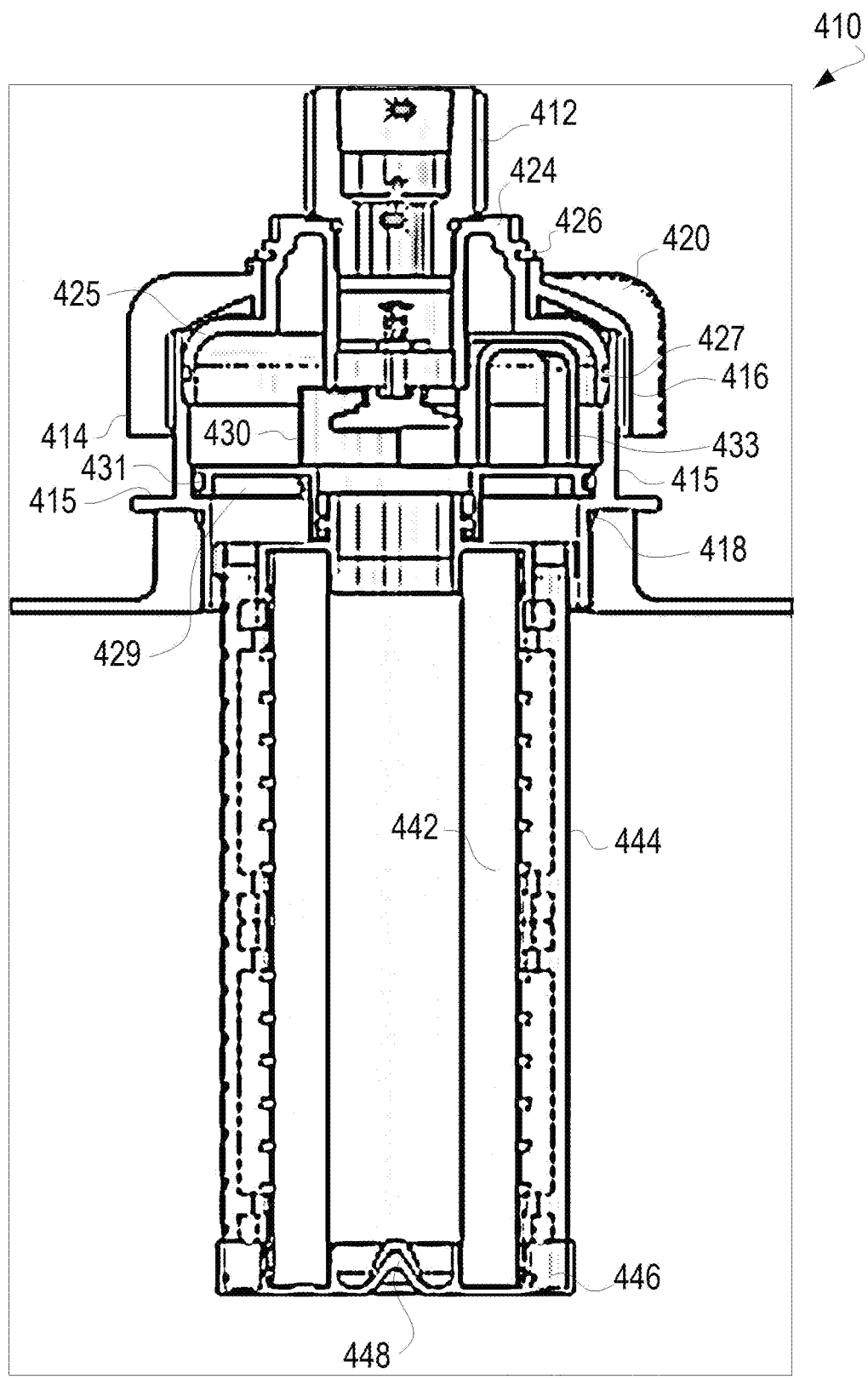
FIG. 5C is a side elevation section view of the return line in-tank filter assembly with disposable filter element according to FIG. 5A.
Figure 6A:
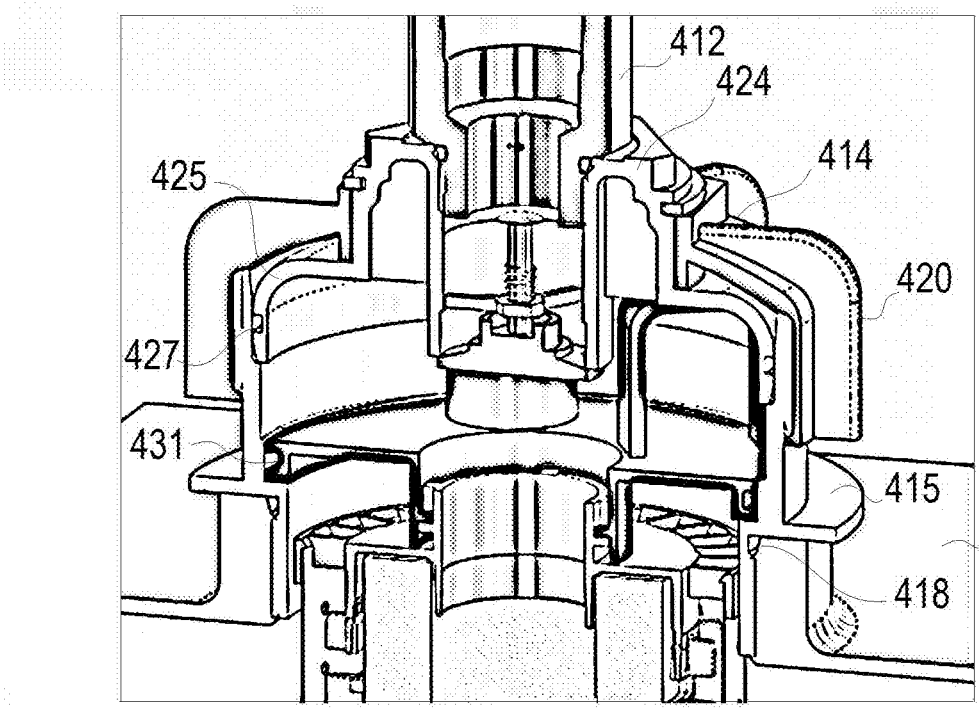
FIGS. 6A-C are perspective section views of an upper portion of the return line in-tank filter assembly with disposable filter element according to FIG. 5A.
Figure 6B:
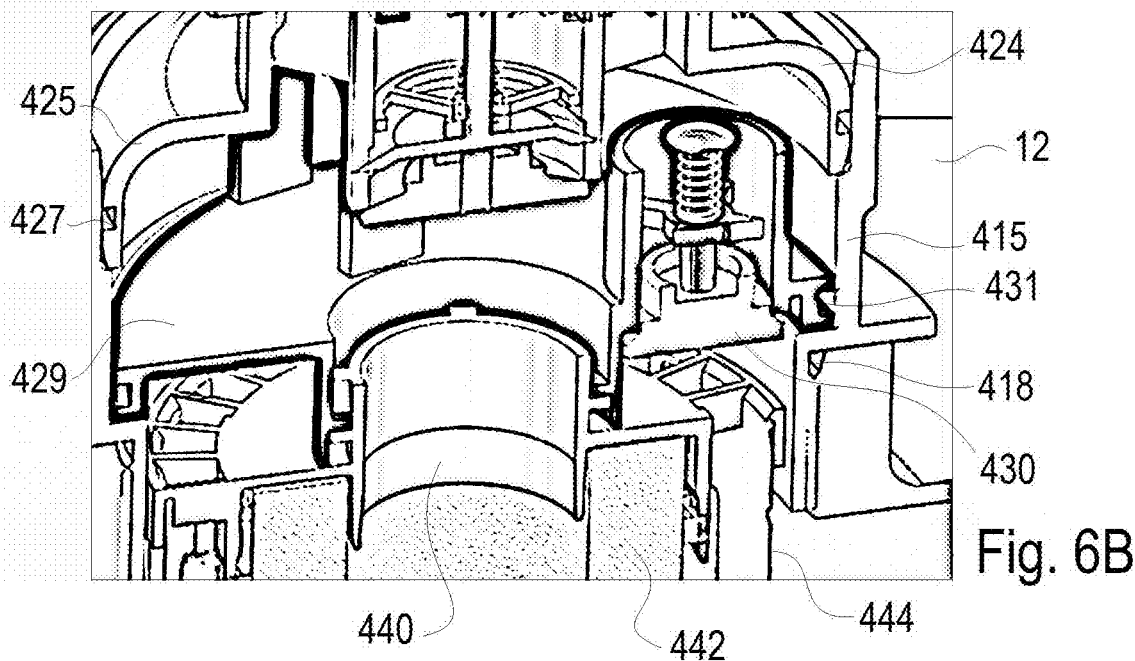
Figure 6C:
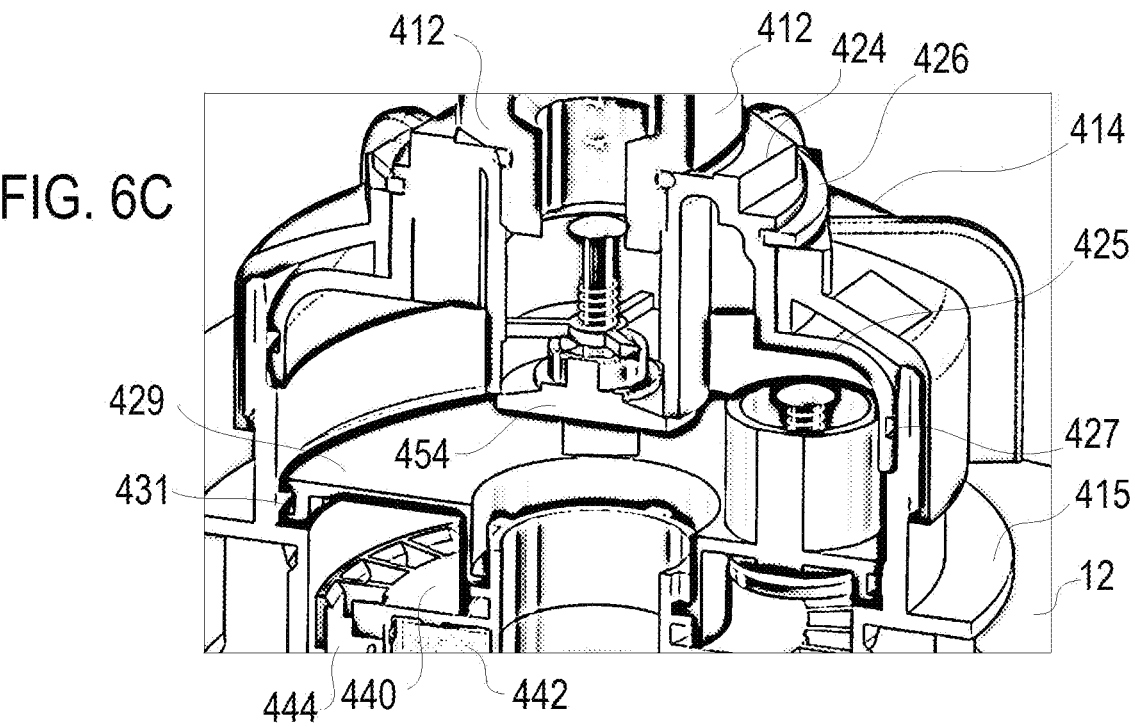

A fourth embodiment of the in-tank filter assembly 310 with disposable filter element set forth in U.S. Patent Application publication 2020-0261833 is shown in FIGS. 4A-B. Assembly 310 includes elements similar to assembly 210 above including a filter assembly mount 314 (which may be molded), threaded tank coupling elements 316, a sealing flange 318, a hex shaped portion 320, an inlet tube 320, an inlet connection 324, a bypass structure 330 a top end cap 340 (integral with the mount 314), filter media 342 and a lower end cap 346. The lower end cap 346 supports the bypass 330. The outer shroud 350 is spaced from the media 342 and extends from the top end cap 240 but not from the lower end cap 346. The outer shroud 350 differs from shroud 250 as it does not include lower outlets 252, and is not supported by the lower endcap 346. The outer shroud 350 extends from the endcap 340, namely from the coupling threads 316, and directs returning fluid that flows through the filter element to a position typically below fluid tank level in the tank before the fluid leaves the shroud 350 via the space between the lower end cap 346 and the shroud 350. The filter element of assembly 310, like assemblies 210, 110 and 10, is an inside out flow design in operation as shown. In operation the filter assembly 310 acts as a bowl-less or housing less in tank return line filter. The filter assembly 310, including the integral filter element, is disposable, like assemblies 210 and 110. For replacement, the filter mount 314 is removed from the tank 12 and the inlet hose removed from the inlet connection 324. The inlet hose is coupled to the inlet connection 324 of the replacement assembly 310 and the mount 314 thereof attached to the tank 12. The entire assembly 310, including the mount 314, is disposable and thus molding the mount 314 may be desirable for cost considerations.

This application builds upon the work set forth in U.S. Patent Application publication 2020-0261833, and the in-tank filter assembly 410 with disposable filter element according to the present invention of the present application is shown in FIGS. 5A-C to 9A-D.

The in-tank filter assembly 410 includes a two piece filter assembly mount comprising an upper filter mount 414 and a lower tank extension member 415. The combined upper filter mount 414 and the lower tank extension member 415 combine in function to form the filter mount of earlier embodiments. The lower tank extension member 415 is coupled to the tank or reservoir proper, but in alternative construction may be considered or formed as part of the tank 12. For example where a weld ring is used the weld ring could take the shape of the weld ring and the lower tank extension member 415 as shown, which is welded to the tank. This separate construction of the lower tank extension member 415 as shown, allows the lower tank extension member 415 to be formed with elements such as threads cooperating with the tank coupling elements 416 on the upper filter mount 414. The tank coupling elements 416 may be any conventional securing elements, such as locking lugs shown or threads or the like with the upper filter mount 414 twisted to lock the upper filter mount 414 in position.

The lower tank extension member 415 further includes a sealing member 418 configured to allow for sealing against cooperating surfaces of the tank 12 (or insert). As shown the sealing member 418 may radially seals against the tank 12. The receipt of the lower tank extension member 415 and the surface cooperating with sealing member 418 are essentially the only tank features needed on the tank 12 to accommodate the filter assembly 410 of the present invention and this greatly simplifies the tank design and construction. The use of an insert, or weld ring, on the tank further simplifies the application of the present invention to a wide variety of tanks and allows for retrofitting the design thereto.

The upper filter mount 414 includes a hex shaped portion with radial ribs 420 to facilitate the coupling and uncoupling of the filter assembly 410 with the tank 12 as described below.

An inlet connection cap 424 is coupled to the upper filter mount 414 through a retaining ring 426 that are received in a groove. A hose connection 412 is coupled to the inlet connection cap 424 through a retaining ring that allows for rotation. The hose connection 412 is coupled to an inlet line of the reservoir in a conventional fashion. Forming the hose connection 412 as separate from the remaining portions of the upper mount 414 allows the filter assembly to accommodate different sized inlet hoses/lines. In other words the same filter assembly 410 can be used with different sized inlet hoses by merely replacing the hose connection 412 with the appropriate sized inlet. Further the hose connection 412 can be replaced with distinct hose couplings, like barb connections, if desired.

The inlet connection cap 424 includes an inner member 425 extending inside and adjacent the lower tank extension member 415 and holds and positions an O-ring seal 427 against the extension member 415 for sealing.

The filter assembly 410 includes an element and bypass plate 429 which includes a bypass structure 430 in the plate 429. The general formation and structure of the bypass structure 430 is known, namely a spring biased member remains closed in conventional operation but as upstream pressure builds (due to clogging of the filter media) the spring is overcome and the bypass structure 430 opens allowing flow to flow around the filter element into the tank 12 in bypass operation. In bypass operation the flow is directed through the perforated wrap into the tank 12 interior.

The plate 429 rests on a ledge formed in the lower tank extension member 415 and further includes a peripheral radial sealing member 431 sealing against the inside of the lower tank extension member 415. It is contemplated that the periphery of the sealing member 431 may have a specialized shape to assure replacement with proper components if needed. The plate 429 can include handles 433 for ease of replacement of the filter element.

The filter assembly 410 includes a filter element mount 432 extending from the plate 429 for coupling a disposable filter element to the filter assembly 410. The filter element mount 432 cooperates with filter element coupling 434 on the top or upper end cap 440 to form a lock and key connection to remove-ably secure the filter element to the filter assembly 410. This is shown in detail in FIGS. 9A-D. A simple twist lock is all that is needed to couple the element to the plate 429.

The filter coupling 434 is attached to the top end cap 440 of the disposable filter element, with filter media 442 and external support wrap extending between the top or upper end cap 440 and a lower or bottom end cap 446. The terms top and upper are used interchangeably in this application as are the terms bottom and lower. The construction of the filter media 442 and the wrap is generally known in the art. For example the media 442 can be formed of a number of desired filter media and generally is a multi-layer structure.

The lower end cap 446 supports an inner fluid diverter 448 to modulate flow within the element, and a perforated outlet wrap 444 spaced from the outer support wrap and media 42 also extending between the top end cap 440 and a lower end cap 446. The diverter 448 reduces turbulence and improves de-aeration within the tank 12.

Figure 7A:
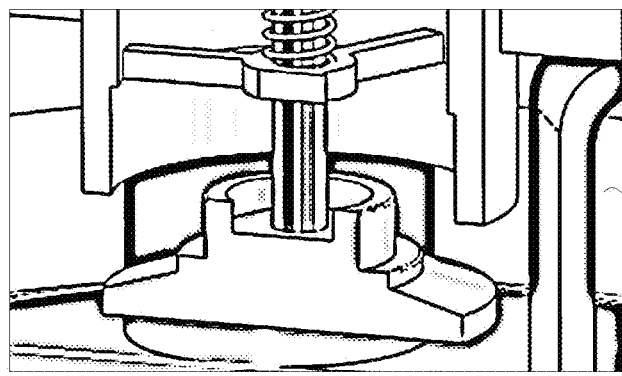
FIGS. 7A-B are perspective section views of an inlet check valve, in two operative positions respectively, of the return line in-tank filter assembly with disposable filter element according to FIG. 5A.
Figure 7B:
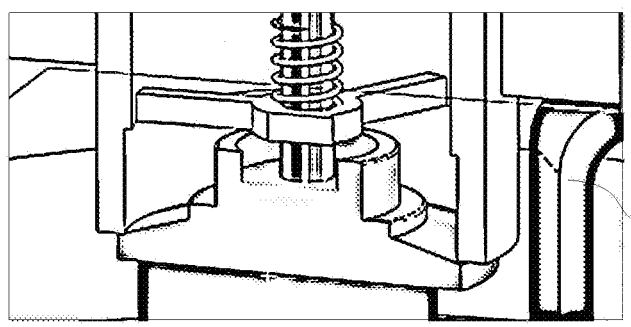

The filter assembly 410 includes a spring biased inlet closing valve 454 on the inlet connection cap 424 that can seat against a sealing surface on the inlet connection cap 424 to close off the inlet. In this embodiment the valve 454 is spring biased to the closed position and will open under conventional operating pressures. The inlet closing valve 454 is helpful to prevent fluid spillage from residual fluid in the inlet line during disposable filter element change-out or replacement. Namely, the valve 454 will seal to facilitate changing of the element by closing off the inlet when the filter element is to be removed, with the operational positions shown in FIGS. 7A-B. This avoid the dripping or flow of the fluid left in the inlet during maintenance. The inlet closing valve 454 is spring biased into the closed position with operational pressure in the inlet, namely any pressure that is higher than head pressure of residual fluid, sufficient to open the valve.

The filter element is an inside-out flow design in operation as shown. In operation the filter assembly 410 acts as a bowl-less or housing less in tank return line filter. The filter element is disposable, with the filter element comprising the combination of filter coupling 434, top end cap 440, filter media 442, external support wrap, lower end cap 446, inner fluid diverter 448, and perforated outlet wrap 444.

Figure 8A:
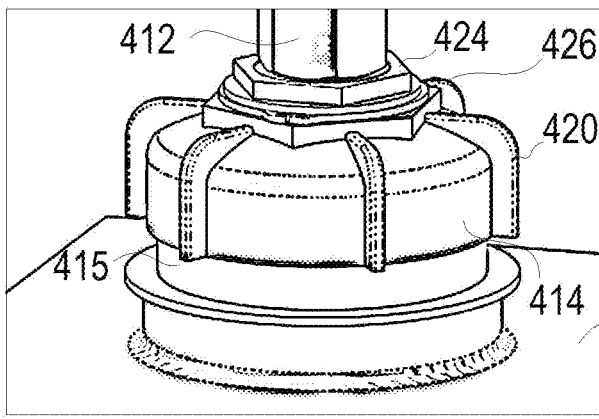
FIGS. 8A-C progressively illustrate the removal of the return line in-tank filter assembly with disposable filter element according to FIG. 5A.
Figure 8B:
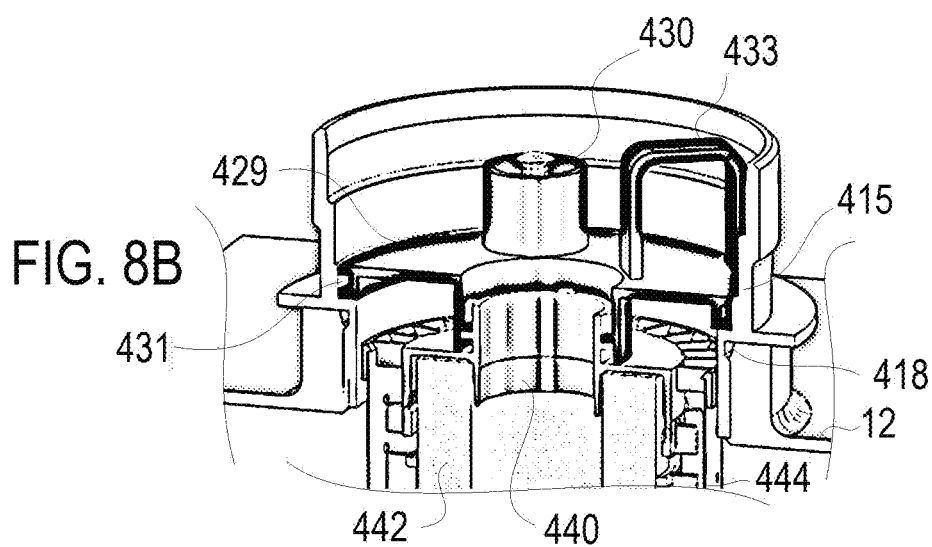
Figure 8C:
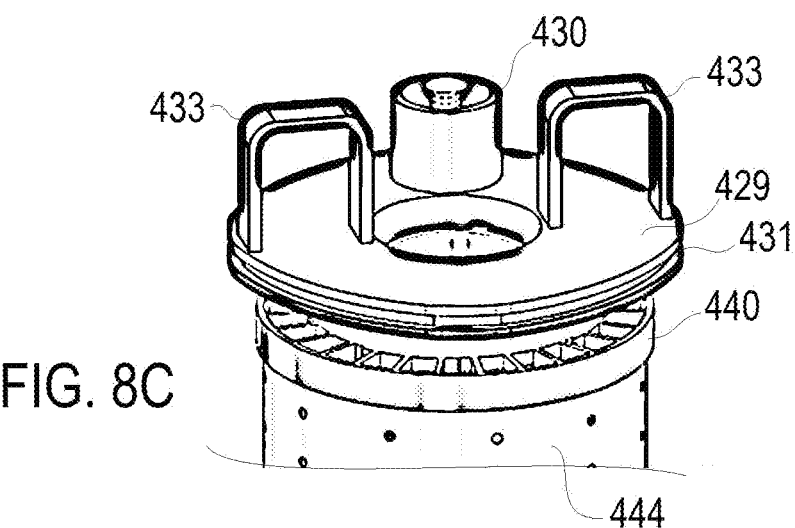
Figure 9A:
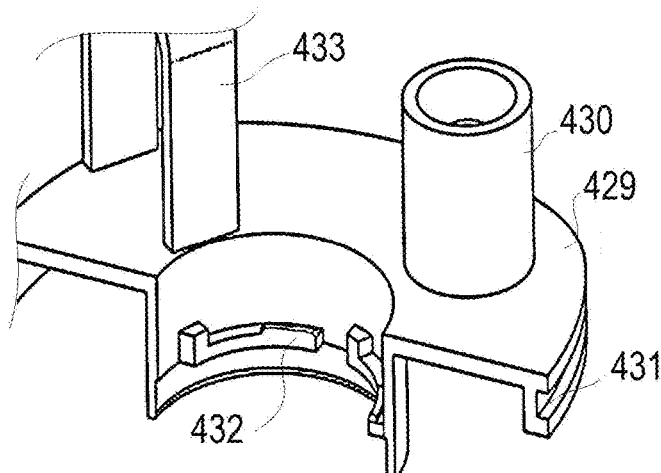
FIGS. 9A-D illustrate a lock and key connection between an element plate and the disposable filter element of the return line in-tank filter assembly with disposable filter element according to FIG. 5A.
Figure 9B:
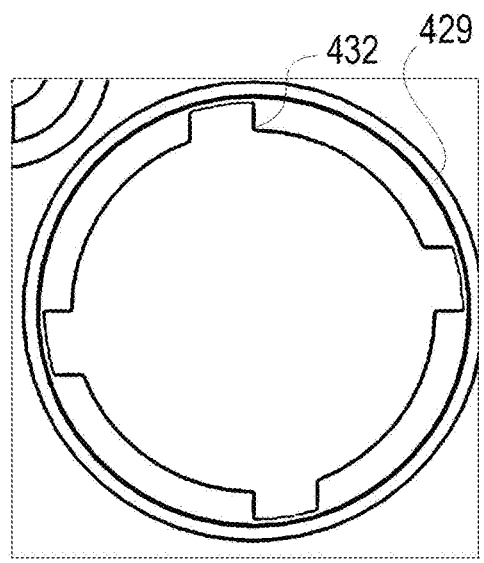
Figure 9C:
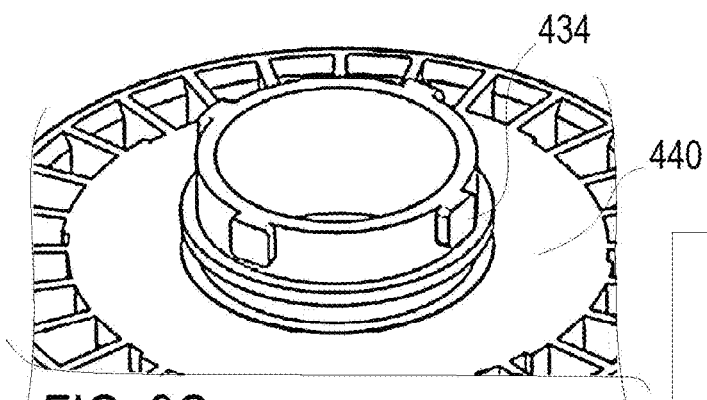
Figure 9D:
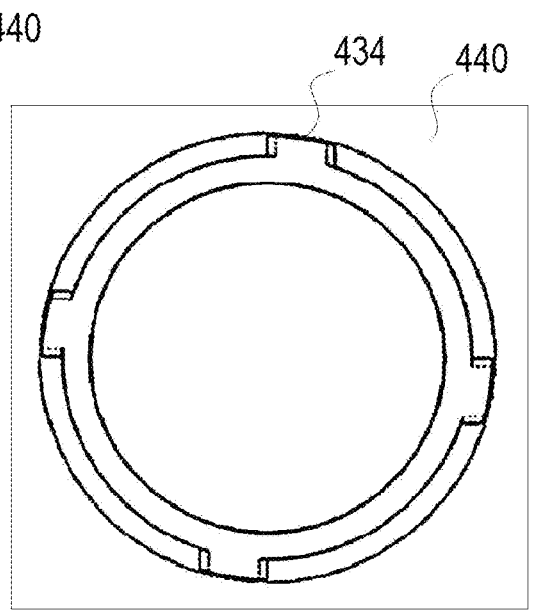

During replacement, the system is shut down and the loss of operation pressure closes the valve 454. The upper mount 414 is removed from lower tank extension member 415 on the tank 12 through gripping the ribs 420 and rotating the upper mount 414. In this configuration the plate 429 and the associated filter element remains in the tank after removal of the upper mount 414. Now, with the interior elements of the assembly 410 exposed as shown in FIG. 8B, the plate 429 and filter element can be removed from the tank via lift handles 433 as represented in FIG. 8C. The filter element decoupled from the plate 429 by disconnecting the lock and key elements formed by 432 and 434. During the removal of the old filter element the inlet closing valve 454 prevents dripping of fluid from the inlet line during the change out. A new disposable filter element (also formed by filter coupling 434, top end cap 440, filter media 442, external support wrap, lower end cap 446, inner fluid diverter 448, perforated outlet wrap 444 and valve opening stem 52) is coupled to the plate 429 and the plate 429 is reattached to lower tank extension 415 in the tank 12. The upper mount 414 and associated structure is maintained and no inlet reattachment is required with the filter assembly 410. The upper mount 414 may be formed of metal or other sufficient material and the cost of forming this is less critical because it is not being replaced.

All of the above embodiments may further include operational performance enhancing features such as magnetic inserts located in the inlet of the filter which operate to strain out magnetic particles increasing filter life. For the shroud implementing embodiments the filter may further include mesh covered openings or the outlet space which evens out fluid flow, lowers fluid velocity and coalesces free air, all combining to de-aerate the fluid.

It will be apparent to those of ordinary skill in the art that various changes may be made to the present invention without departing from the spirit and scope thereof. The spirit and scope of the present invention is defined in the appended claims and equivalents thereto.

What is claimed is:

1. An in-tank filter assembly for an industrial fluid reservoir tank comprising:
   a two piece filter assembly mount comprising an upper filter mount and a lower tank extension member removably coupled together, wherein the lower tank extension member includes tank coupling elements to secure the filter assembly mount to a tank, and wherein the upper filter mount includes an inlet connection defining an inlet and configured to be coupled to an inlet line of the tank;
   an element and bypass plate;
   a bypass structure within the element and bypass plate configured to selectively open allowing flow to flow around a disposable filter element of the in-tank filter assembly into the tank in bypass operation;
   a filter element mount coupled to the element and bypass plate; and
   the disposable filter element removably coupled to the filter element mount through a filter element coupling and including at least a top end cap and a bottom end cap with filter media extending between the top end cap and the bottom end cap, wherein the in-tank filter assembly forms a bowl-less in tank return line filter having inside-out flow; and
   an inlet closing valve configured to selectively close off the inlet and biased toward a closed position, wherein the inlet closing valve is configured to automatically close off the inlet when the disposable filter element is removed from the filter element mount.

2. The in-tank filter assembly for an industrial fluid reservoir tank according to claim 1 wherein the upper filter mount of the filter assembly mount includes a hex shaped portion to facilitate the coupling and uncoupling of the filter assembly with the tank.

3. The in-tank filter assembly for an industrial fluid reservoir tank according to claim 2 wherein the inlet connection includes an inlet connection cap coupled to the upper filter mount and a hose connection coupled to the inlet connection cap via a coupling that allows for rotation.

4. The in-tank filter assembly for an industrial fluid reservoir tank according to according to claim 3 wherein the bypass structure forms an elevated flow path that avoids having contaminants within an interior space of the filter element from flowing into the interior of the tank during bypass operation.

5. The in-tank filter assembly for an industrial fluid reservoir tank according to according to claim 4 wherein the filter element mount extends below the bypass structure.

6. The in-tank filter assembly for an industrial fluid reservoir tank according to according to claim 5 wherein the element and bypass plate is supported on a ledge formed by a lower tank extension member.

7. The in-tank filter assembly for an industrial fluid reservoir tank according to claim 6 wherein the filter element mount cooperates with the filter element coupling to form a lock and key connection to remove-ably secure the disposable filter element to the filter assembly.

8. The in-tank filter assembly for an industrial fluid reservoir tank according to claim 7 wherein the disposable filter element further includes external support wrap extending between the top end cap and the lower end cap.

9. The in-tank filter assembly for an industrial fluid reservoir tank according to claim 7 wherein the disposable filter element further includes an inner fluid diverter to modulate flow within the disposable filter element supported on the bottom end cap.

10. The in-tank filter assembly for an industrial fluid reservoir tank according to claim 9 wherein the disposable filter element further includes a perforated outlet wrap extending between the top end cap and the lower end cap.

11. The in-tank filter assembly for an industrial fluid reservoir tank according to claim 10 wherein inlet closing valve is spring biased to the closed position and will open under conventional operating pressures.

12. The in-tank filter assembly for an industrial fluid reservoir tank according to claim 11 wherein the upper filter mount includes radial ribs to facilitate the coupling and uncoupling of the filter assembly with the tank.

13. The in-tank filter assembly for an industrial fluid reservoir tank according to claim 12 wherein the element and bypass plate includes at least one handle for ease of replacement of the disposable filter element.

14. The in-tank filter assembly for an industrial fluid reservoir tank according to claim 13 wherein the element and bypass plate includes a peripheral radial sealing member sealing against the inside of the lower tank extension member.

15. The in-tank filter assembly for an industrial fluid reservoir tank according to claim 1 wherein the inlet connection includes an inlet connection cap coupled to the upper filter mount and a hose connection coupled to the inlet connection cap via a rotational coupling.

16. The in-tank filter assembly for an industrial fluid reservoir tank according to according to claim 1 wherein the bypass structure forms an elevated flow path that avoids having contaminants within an interior space of the disposable filter element from flowing into the interior of the tank during bypass operation.

17. The in-tank filter assembly for an industrial fluid reservoir tank according to according to claim 1 wherein the filter element mount extends below the bypass structure.

18. The in-tank filter assembly for an industrial fluid reservoir tank according to according to claim 1 wherein the element and bypass plate is supported on a ledge formed by a lower tank extension member.

19. The in-tank filter assembly for an industrial fluid reservoir tank according to claim 1 wherein the filter element mount cooperates with filter element coupling to form a lock and key connection to remove-ably secure the disposable filter element to the filter assembly.

\* \* \* \* \*